(12) United States Patent
Simon et al.

(10) Patent No.: US 11,639,217 B2
(45) Date of Patent: May 2, 2023

(54) PROCEDURE FOR MANEUVERING A HYBRID AERODYNE OF VTOL OR STOL

(71) Applicant: INNOSTAR, Chatillon (FR)

(72) Inventors: Jean-Michel Simon, Chatillon (FR); Philippe Roesch, Aix en Provence (FR)

(73) Assignee: INNOSTAR, Chatillon (FR)

( * ) Notice: Subject to any disclaimer, the term of this patent is extended or adjusted under 35 U.S.C. 154(b) by 137 days.

(21) Appl. No.: 16/980,296

(22) PCT Filed: Mar. 13, 2019

(86) PCT No.: PCT/EP2019/056318
§ 371 (c)(1),
(2) Date: Sep. 11, 2020

(87) PCT Pub. No.: WO2019/175264
PCT Pub. Date: Sep. 19, 2019

(65) Prior Publication Data
US 2021/0011493 A1     Jan. 14, 2021

(30) Foreign Application Priority Data
Mar. 13, 2018 (FR) .................... 18 52172

(51) Int. Cl.
B64C 27/30 (2006.01)
B64C 27/26 (2006.01)

(52) U.S. Cl.
CPC .............. B64C 27/30 (2013.01); B64C 27/26 (2013.01)

(58) Field of Classification Search
CPC ..... B64C 27/22; B64C 29/00; B64C 29/0008; B64C 29/0016; B64C 29/0025;
(Continued)

(56) References Cited

U.S. PATENT DOCUMENTS

| 2,247,034 A | 6/1941 | Pitcairn |
| 6,622,962 B1 * | 9/2003 | White ..................... B64C 27/26 244/12.3 |

(Continued)

FOREIGN PATENT DOCUMENTS

| DE | 383661 C | 10/1923 |
| DE | 102009015805 A1 | 10/2010 |

(Continued)

*Primary Examiner* — Joshua J Michener
*Assistant Examiner* — Cindi M Curry
(74) *Attorney, Agent, or Firm* — Muncy, Geissler, Olds & Lowe, P.C.

(57) ABSTRACT

An aerodyne comprises a fuselage, a fixed wing, a thruster for cruising flight, and a rotary wing for stages of vertical flight and held stationary during cruising flight. The rotary wing includes at least two contrarotating single-blades disposed at the top of the fuselage and hinged about respective axes perpendicular to the rotor axes of rotation. A maneuvering procedure for maneuvering the aerodyne includes a transition stage between a stage of vertical flight and a stage of cruising flight, wherein in the transition stage, when the speed of each single-blade is less than a threshold speed of rotation, the pitch of each single-blade is such that it no longer provides any lift force and the transverse hinge of the single-blade to its rotor axis is held locked in a position such that the single-blade is perpendicular to the rotor shaft.

3 Claims, 2 Drawing Sheets

(58) Field of Classification Search
CPC ..... B64C 29/0083; B64C 27/30; B64C 27/26; B64C 27/08; B64C 39/024
See application file for complete search history.

(56) References Cited

U.S. PATENT DOCUMENTS

| | | |
|---|---|---|
| 7,490,792 B1 | 2/2009 | Carter, Jr. |
| 2017/0225779 A1* | 8/2017 | Gamble .................. B64C 27/30 |
| 2017/0341740 A1* | 11/2017 | Vander Lind ........... B64C 27/26 |
| 2019/0291626 A1* | 9/2019 | Duffy .................. B64C 29/0025 |
| 2020/0079501 A1* | 3/2020 | Graves ...................... B64C 9/00 |

FOREIGN PATENT DOCUMENTS

| | | | |
|---|---|---|---|
| EP | 2468627 A1 | 6/2012 | |
| WO | WO-2017/021608 A1 | 2/2017 | |
| WO | WO-2017021608 A1 * | 2/2017 | ........... B64C 27/008 |

* cited by examiner

PROCEDURE FOR MANEUVERING A HYBRID AERODYNE OF VTOL OR STOL

The invention relates to a vertical or short takeoff and/or landing (VTOL or STOL) hybrid aerodyne, of medium-sized drone type capable of high-speed and/or long-range cruising flight. The aerodyne is of the type that is fitted both with a fixed wing associated with a propulsion system for cruising flight and also with a rotary wing for stages of vertical flight and suitable for being kept stationary in cruising flight. The term "medium-sized" is used to designate an aerodyne for which one of the main requirements is long endurance in flight, e.g. for coastal surveillance missions.

BACKGROUND OF THE INVENTION

The invention lies within a state of the art that is numerous and varied, e.g. such as that described in Document WO2017/021608.

The idea of using one or more single-blade rotors ("single-blades") in hybrid VTOL "stoprotor" designs is a very old idea. Specifically, a single-blade presents a manifest advantage concerning the drag of the rotary wing while its rotation is stopped, where minimizing drag is a problem that needs to be solved in flying machines of this kind if it is desired to achieve high speeds in the cruising configuration.

No such system has been genuinely developed and made commercially available. The reasons that have led to the failure of such systems and that lead to a better understanding of the advantage of the present invention, are believed to be as follows:

if the rotary wing is to be aerodynamically "hidden" in horizontal flight, the mechanisms that have been proposed are too complex, and that operation includes stages of aerodynamic instability both at the time the wing is being stowed, after takeoff and while transitioning to cruising flight, and also at the time it is being deployed for landing; and if the rotor is not hidden in cruising flight and is left free in the air stream (or "relative airflow"), then, in order to have satisfactory takeoff power, one of two things apply:

either the rotor has a diameter that is large, and consequently has blades of considerable length, which leads to instabilities when stopping and/or restarting rotation of the rotor while the rotor does not have the stabilizing effect of centrifugal force. Specifically, in order to be aerodynamically efficient, the blades of the rotor need to be relatively fine, and thus relatively flexible, and they need to present good aeroelastic performance, like the blades of modern helicopter rotors; or else use must be made of blades that are shorter and more rigid, and thus more stable, but then the power needed to provide sufficient lift is very high, which undermines the advantage of the concept.

The invention relates to an aerodyne having at least two single-blades that are spaced apart longitudinally along the roll axis of the aircraft, e.g. as shown in FIGS. 16*a* and 16*b* of Document WO2017/021608.

Those figures are diagrams showing an aerodyne respectively in hovering or vertical flight and in horizontal or cruising flight, the aerodyne having a fixed wing supported by a fuselage that also supports a moving wing for providing lift in vertical flight, rotation of that wing being stopped at the end of a transition stage from vertical flight to high-speed horizontal cruising flight.

The moving wing comprises two contrarotating single-blades with axes of rotation that are offset from each other along the roll axis of the aerodyne. In cruising flight, each of the single-blades extends longitudinally towards the rear of the aerodyne, with only counterweights and rigid portions that support them extending forwards from their respective rotor masts.

An object of the invention is to optimize the performance of an aerodyne of that type in a manner that is realistic.

The improvement in performance stems in part from using means that improve its configurations during periods of transition between vertical flight and horizontal flight, after takeoff and before landing.

SUMMARY OF THE INVENTION

To this end, the invention provides a maneuvering procedure for maneuvering a hybrid aerodyne, the aerodyne comprising a fuselage, a fixed wing, a propulsion system comprising at least one thruster for cruising flight, and a rotary wing for stages of vertical flight and suitable for being held stationary during cruising flight of the aerodyne, the rotary wing being suitable for producing lift by rotating in a stage of vertical flight and for being stopped and stowed longitudinally in a stage of cruising flight, the rotary wing being the type comprising at least two contrarotating single-blades with counterweights, both being situated at the top of the fuselage, the single-blades being hinged about respective axes perpendicular to the rotor axes of rotation, substantially at said rotor mast axes of rotation, the procedure including a transition stage between a stage of vertical flight and a stage of cruising flight, and being characterized in that in the transition stage, so long as the speed of each single-blade is less than a threshold speed of rotation of the order of 60% of the nominal speed of rotation, the pitch of each single-blade is such that it no longer provides any lift force and the transverse hinge of the single-blade to its rotor axis is held locked in a position such that the single-blade is perpendicular to the rotor shaft.

In more complete manner, the procedure of the invention for maneuvering the aerodyne comprises the following stages:

a/ Takeoff vertical flight:
Starting rotation of the rotary wing with zero collective pitch;
Releasing the hinges of the single-blades above a certain speed of rotation (60% of the nominal speed);
Increasing the speed of rotation up to the nominal speed of rotation;
Increasing the collective pitch of the blades so as to enable takeoff; and
Starting the propulsion system (at any time during the stage) without generating thrust, the pitch of the propellers being set to have no effect in this respect;

b/ Takeoff/cruising transition:
Increasing the pitch of the propellers of the propulsion system;
Zeroing the pitch of the blades of the rotary wing and reducing the speed of rotation of the rotary wing;
Locking the transverse hinges of the single-blades with the rotors; and
Stopping rotation and mechanically indexing the stopped position of each blade;

c/ Cruising flight under thrust from the cruising propulsion system;

d/ Cruising flight/vertical landing flight transition:
Reducing thrust from the cruising propulsion system down to a speed slightly greater than stalling speed (e.g. 20% above stalling speed);
Setting the blades into rotation at zero pitch with their hinges locked;
Unlocking the hinges of the blades above some minimum speed of rotation (e.g. 60% of the nominal speed of rotation);
Increasing the speed of rotation up to the nominal speed, and then increasing the pitch; and
Stopping the cruising thruster or setting the propeller pitch so as not to generate thrust; and
e/ Vertical landing flight similar to that of any rotary wing aircraft.

These thrust controls need to be synchronized with hybridizing the flight controls both in "helicopter" (or vertical flight) mode and in "airplane" (or cruising flight) mode in order to ensure the aircraft transitions smoothly and without jolting between "rotor" controls for hovering flight (at the end of upward vertical flight or at the beginning of downward vertical flight) and the "control surface" controls for cruising flight. A mixing or hybridizing coefficient is defined $K=_{Min}[(V/Vs)^2,1]$ with V being the cruising speed of the airplane and Vs being its stalling speed. It should be observed that the control surface controls remain active during vertical flight.

Other characteristics and advantages of the invention appear from the following description of an embodiment of the invention.

BRIEF DESCRIPTION OF THE DRAWINGS

Reference is made to the accompanying drawings, in which.

DETAILED DESCRIPTION OF THE INVENTION

Figure 1:
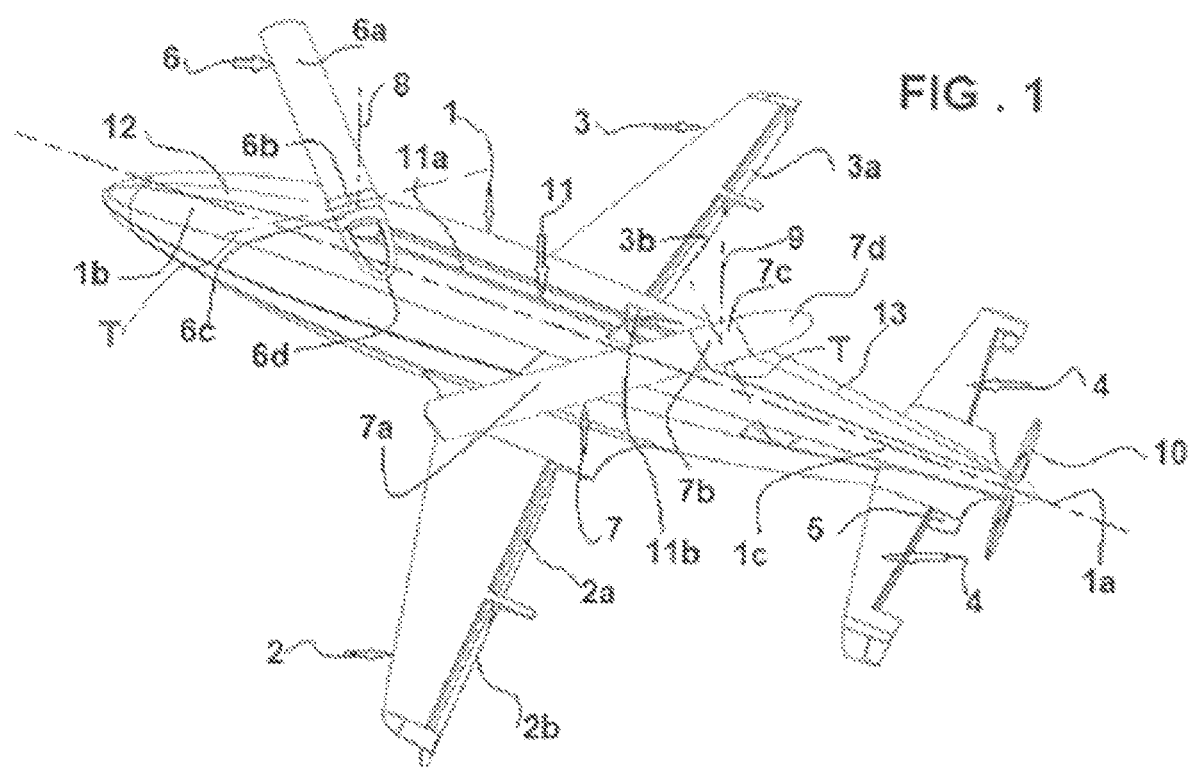
FIG. 1 shows an example of a flying machine in accordance with the invention in its vertical flight configuration.

The aerodyne shown in the figures comprises a fuselage 1 with its roll axis referenced 1a. The fuselage is fitted with a fixed wing comprising main wings 2 and 3, an upside-down U-shaped tail 4, and a tail fin 5, in conventional manner well-known to the person skilled in the art. It should be observed that the wings 2 and 3 possess respective control surfaces 2a, 1b and 3a, 3b shown extending down in FIGS. 1 and 3 and in service in FIGS. 2 and 4. In known manner, the horizontal branches of the tail also include control surfaces 4a. In the embodiment shown in the figures, the aerodyne of the invention has a front single-blade 6 and a rear single-blade 7. The front single-blade 6 has an active blade 6a that generates lift while it is rotating. This single-blade is made up both of a first portion 6b that carries said active blade and that constitutes the connection between the active blade and a rotor mast 8, and also of a second portion 6c that carries the counterweight 6d and that connects it to the rotor mast 8. It should be observed that the portion 6c and the counterweight 6d are hollowed out to improve their aerodynamic performance.

The assembly constituted in this way by the active blade 6a and by the rigid portion 6b that carries it is hinged about a transverse axis T perpendicular to the axis of rotation of the rotor and substantially at said axis of rotation of the rotor mast. This arrangement is itself known and is described in above-mentioned Document WO2017/021608.

The rear single-blade 7 is of the same structure as the blade 6, having an active blade 7a, a counterweight 7d, and rigid portions 7b and 7c connecting those two elements to a rotor mast 9.

At the rear of the fuselage, the aerodyne has a thruster 10 (e.g. using propellers) for producing thrust during cruising flight.

Figure 2:
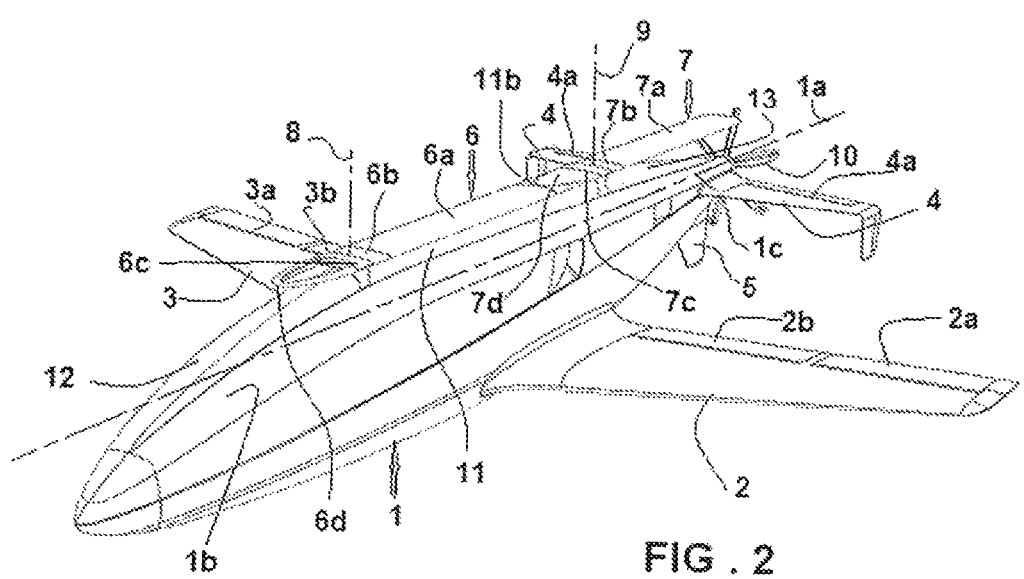
FIG. 2 shows the FIG. 1 machine in cruising flight.
Figure 4:
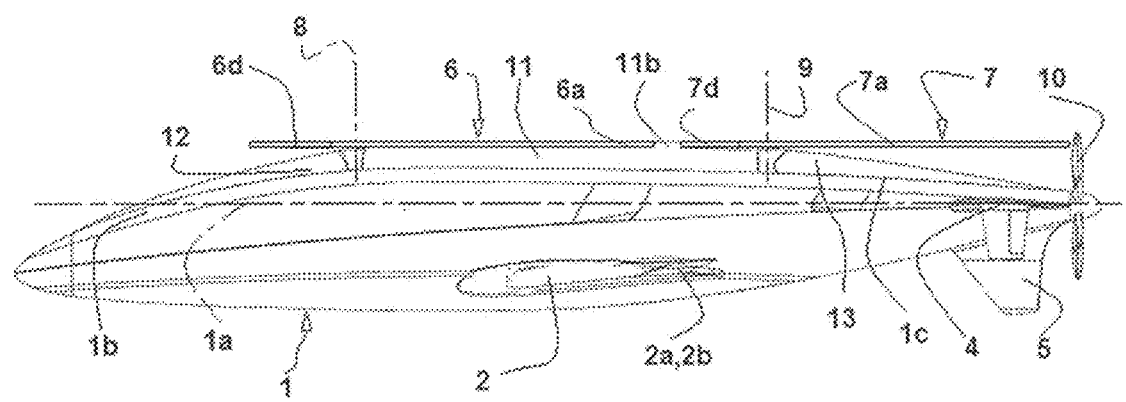
FIG. 4 is the same side view as FIG. 3, the aircraft being in its cruising configuration.

In FIGS. 2 and 4, it can be seen that each of the single-blades extends longitudinally towards the rear of the aerodyne, with only the counterweights and the rigid portions that support them extending forwards from their respective rotor masts 8 and 9.

Figure 3:
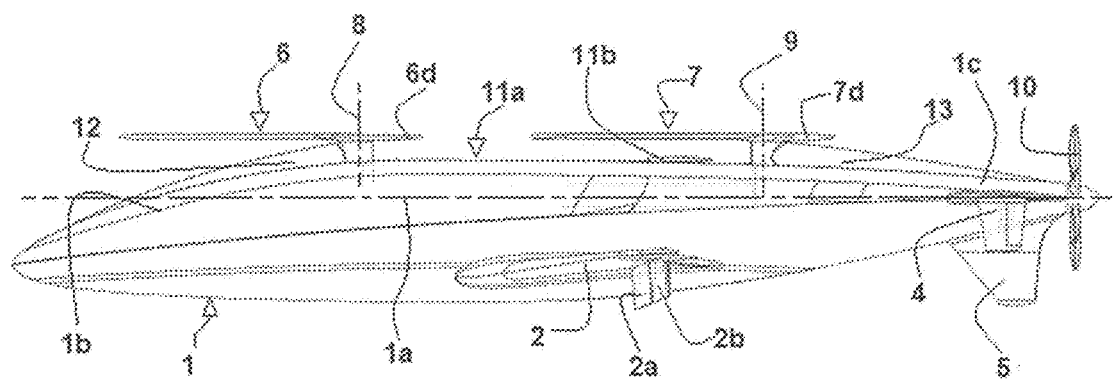
FIG. 3 is a side view of the aircraft of the invention in vertical flight.

In this embodiment of the aerodyne, a structural element 11 is situated at the top of the fuselage and is movable relative thereto between a retracted position towards the outside surface of the fuselage so as to be flush with said surface or so as to remain in its vicinity—and in any event spaced apart from the rotary wing—and a service position projecting from said surface of the fuselage. The retracted position is shown in FIGS. 1 and 3. The service position is the position shown in FIGS. 2 and 4. In FIGS. 1 and 3, the aerodyne is flying vertically, with the single-blades rotating synchronously in contrarotation from a particular starting position, which is the position shown in FIGS. 2 and 4 where they are stopped, extending longitudinally above the fuselage 1. In these figures, the aerodyne is shown in substantially horizontal flight (cruising flight). In this configuration, the rotary wing is a handicap concerning the drag of the aircraft, since the wing gives rise to large aerodynamic disturbances and to a large amount of turbulence in the relative airflow.

When projecting from the fuselage, the element 11 constitutes a blocking element for blocking the portion 6a of the single-blade in a position in which it is accurately aligned with the direction of the relative airflow in cruising flight. Its longitudinal size enables it to press against the underside of the counterweight 7d of the blade 7, thereby confirming its alignment with the blade ahead of it. Finally, it possesses a portion in relief 11b that is received between the end of the blade 6 and the end of the counterweight 7d of the blade 7, thereby filling in the surface continuity gap that necessarily exists between two blades.

According to another characteristic of the aerodyne, the fuselage 1 presents a front portion 1b that dips below its roll axis 1a, with the rotor mast 8 of the front single-blade 6 being situated substantially at the junction between this portion and the main portion of the fuselage. This dipping portion 1b is provided with a streamlined stationary protuberance 12 lying on the axis of the element 11 so as to further enhance better aerodynamic flow.

In analogous manner, the fuselage 1 presents a rear portion 1c that also dips below its roll axis 1a, with the rotor mast 9 of the rear single-blade 7 being situated substantially at the junction between this portion and the main portion of the fuselage. This dipping portion 1c is provided with a streamlined stationary protuberance 13 in line with the element 11 also for the purpose of enhancing aerodynamic flow.

The operation of the aerodyne of the invention is conducted using the following procedure.

Five flight configurations are identified: the vertical takeoff stage, the transition stage between vertical flight and cruising flight, the cruising flight stage, the transition stage between cruising flight and landing vertical flight, and the stage of vertical landing flight.

The particular features of this procedure lie in the two transitional stages. Specifically, the means implemented in the invention enable each of these transitional stages between cruising flight and either one of upward and downward vertical flight to pass through a state in which:

the speed of rotation of the rotary wing is greater than 60% of its nominal speed of rotation, the pitch of each single-blade is reduced so that it no longer provides any lift force, and the transverse hinge between each single-blade and the rotor shaft is locked in a position such that the single-blade is perpendicular to the rotor shaft. It should be understood that the "nominal speed of rotation" of the rotary wing is its speed of rotation that enables the aircraft to take off. Furthermore, the value of 60% as given above is indicative of a speed of rotation that must be sufficient to ensure that, as a result of internal tension in the blade due to centrifugal force, the blade presents very little sensitivity to "parasitic" forces (lateral gusts of wind, . . . ). such as, for example, that have effects on the aircraft that become larger with the cruising flight speed being small during the transition stage, thus making the machine more sensitive to variations in its environment.

Thus, the complete procedure is conducted as follows:

a/ Takeoff vertical flight:

Starting rotation of the rotary wing/blades 6, 7 with zero collective pitch;

Releasing the hinges of the single-blades above a certain rotation threshold (60% of nominal speed) so that centrifugal force is sufficient to prevent the single-blade deforming under the effect of parasitic aerodynamic forces;

Increasing the speed of rotation up to the nominal speed of rotation;

Increasing the collective pitch of the rotary wing/blades 6, 7 so as to enable takeoff;

Starting the propulsion system 10 (at any time during the stage) with a propeller pitch set to avoid generating thrust;

b/ Takeoff/cruising transition:

Increasing the propeller pitch of the propulsion system 10;

Zeroing the pitch of the blades of the rotary wing and reducing the speed of rotation of the rotary wing;

Locking the transverse hinges of the single-blades to the rotors while the speed of rotation is still generating sufficient centrifugal force to oppose bending of the single-blades under their own weight or to withstand untimely aerodynamic forces; and Stopping the rotation and mechanically indexing the stopped position of each blade (on this topic, it should be observed that the blades can be indexed in their stowage positions by any motor-driven mechanical means used after stopping their flight rotation);

c/ Cruising flight under thrust from the system 10;

d/ Transition from cruising flight to vertical landing flight:

Reducing thrust from the thruster 10 down to a speed slightly greater than stalling speed (e.g. 20% above stalling speed);

Lowering the element 11 and releasing the blades;

Setting the blades into rotation at zero pitch with their hinges locked;

Unlocking the hinges of the blades above some minimum speed of rotation (e.g. 60% of the nominal speed of rotation);

Increasing the speed of rotation up to the nominal speed, and then increasing the pitch; and Stopping the thruster 10 and/or continuing to rotate the propeller with its pitch set to generate no thrust; and e/ Vertical landing flight similar to that of any rotary wing aircraft.

This maneuvering procedure also implies hybridizing the controls of the lift means constituted by the rotary wing and by the fixed wing during the stage of transition between the two flight configurations. In VTOL mode (vertical flight), the "airplane" controls are active and progressively they take the place of the controls for disengaging the "rotor" with increasing speed up to the transition, or else they alone serve to control the machine in cruising flight (while the pitch of the blades is zero). In the same manner, this hybridizing ensures that the controls for re-engaging the rotor are activated progressively during the stage of transition between cruising flight and vertical landing flight.

In VTOL mode, the "airplane" controls are active and progressively they take the place of the "rotor" controls for disengaging the "rotor" with increasing speed up to the transition, where they alone serve to control the aircraft (while the pitch of the blades is zero). Below, a subscript $v$ in front of a variable indicates that the variable is a vector.

Let $_v x$ be the vector of the "flight control positions" {longitudinal stick, lateral stick, pedals, collective pitch lever, propeller pitch}.

Let $_v yR$ be the vector of the "rotor servocontrol positions" {differential collective pitch, lateral pitch, collective pitch, differential lateral pitch, general collective pitch, propeller pitch}.

Let $_v x \rightarrow _v yR(0,_v x)$ be the laws defining the control of the "rotor" pitch controls in hovering flight (V=0).

Let $_v yA$ be the vector of "positions of the airplane control surfaces" {elevators, rudder, ailerons, propeller pitch}.

Let $_v x \rightarrow _v yA(1,_v x)$ be the laws defining the control dynamics of the "airplane" control surfaces for V≥Vs. (V being the speed of the aircraft in airplane mode and Vs being its stall speed).

Assuming that the "airplane" and "helicopter" flight control hybridization is defined as a function of speed by: $_v yR(K,_v x)=(1-K)_v yR(0,_v x)$ and $_v yA(K,_v x)=_v yA(1,_v x)$ Where $K=\text{Min}[(V/VS)^2, 1]$ designates the "mixing" or hybridization coefficient in the range 0≤K≤1 between the "airplane" controls and the "rotor" controls that is selected to be equal to the wing lift ratio.

It is ensured that the blade pitch is indeed zero at the transition, regardless of the position of the flight controls $_v yR(1,_v x)=_v 0$ and that the transition between the "rotor" controls in hovering flight (K=0) and the "airplane" controls (K=1) in cruising flight V≥Vs takes place smoothly and without jolting.

The invention is not limited to the example described above, but covers any embodiment variant coming within the ambit of the claims.

The invention claimed is:

1. A maneuvering procedure for maneuvering a hybrid aerodyne comprising a fuselage, a fixed wing, a thruster for cruising flight, and a rotary wing for stages of vertical flight and configured to be held stationary during cruising flight of the aerodyne, the rotary wing configured to produce lift by rotating in a stage of vertical flight and for being stopped and stowed longitudinally in a stage of cruising flight, the rotary wing comprising at least two contrarotating single-blades with counterweights, the at least two contrarotating single-blades being disposed at the top of the fuselage, the at least two contrarotating single-blades being hinged about respective axes perpendicular to rotor axes of rotation, comprising the following stages:
- a takeoff vertical flight stage comprising:
  - starting rotation of the single-blades with zero collective pitch and with the single-blades blocked with respect to the transverse axes;
  - releasing the single-blades around said transverse axes when a minimum speed of rotation of 60% of the nominal speed of rotation is reached;
  - increasing said speed of rotation up to a nominal speed of rotation;
  - increasing the collective pitch of the single-blades to enable takeoff; and
  - starting the thruster without generating thrust;
- a takeoff/cruising transition stage comprising:
- increasing a pitch of propellers of the thruster;
- zeroing a pitch of the single-blades and reducing a speed of rotation thereof;
- locking the single-blades with respect to said transverse axes; and
- stopping rotation and mechanically indexing a stopped position of each of the at least two contra-rotating single-blades;
- a cruising flight under thrust from the thruster stage;
- a cruising flight/vertical landing flight transition stage comprising:
  - reducing thrust from the thruster to a speed slightly greater than a stalling speed;
  - setting the said locked single-blades into rotation at zero pitch;
  - unlocking said single-blades around said transverse axes when their rotation approaches 60% of the nominal speed of rotation;
  - increasing the speed of rotation up to the nominal speed of rotation, and then increasing the pitch of the single-blades; and
  - stopping the thruster;
- a vertical landing stage controlled by the single-blades rotation.

2. The maneuvering procedure according to claim 1, wherein in the transition stage between cruising flight and vertical flight, vertical flight controls and cruising flight controls are hybridized by applying a mixing coefficient K in various servocontrol equations of the vertical flight controls and the cruising flight controls, the mixing coefficient K being such that $K=(V/Vs)^2$ where V is the speed of the aircraft in airplane mode and Vs is its stalling speed, the mixing coefficient K being bounded above the stalling speed by the value 1 and being equal to 0 during vertical flight of the aircraft.

3. The maneuvering procedure according to claim 2, wherein during stages of transition between vertical flight and cruising flight, airplane flight controls are proportional to K and the vertical flight controls are proportional to (1-K).

* * * * *